July 8, 1952 — G. T. RANDOL — 2,602,428
FLUID ACTUATED SERVOMOTOR CONTROL SYSTEM
Filed Nov. 17, 1947 — 2 SHEETS—SHEET 1

INVENTOR:
Glenn T. Randol,
BY Lamphere and Van Valkenburgh
ATTORNEYS.

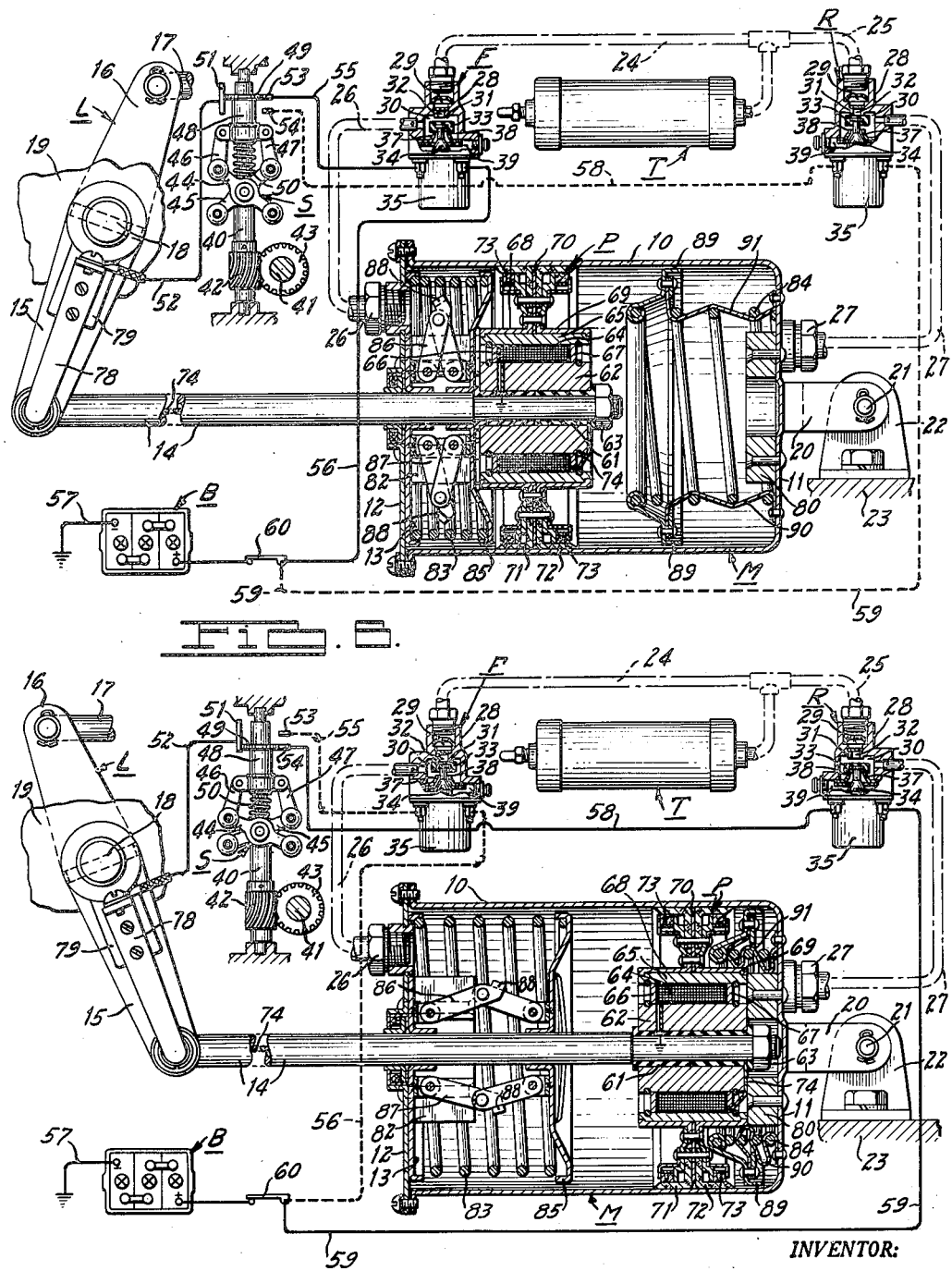

Patented July 8, 1952

2,602,428

UNITED STATES PATENT OFFICE 2,602,428

FLUID ACTUATED SERVOMOTOR CONTROL SYSTEM

Glenn T. Randol, Fort Lauderdale, Fla.

Application November 17, 1947, Serial No. 786,498

14 Claims. (Cl. 121—40)

This invention relates to control systems for fluid pressure actuated servomotors, and more particularly to novel and improved valving and electro-magnetic controlling means for actuating and holding the movable element of such servomotors in various actuated positions.

One of the objects of the invention is to provide improved means including electro-magnetic means for controlling the movable element of a servomotor.

A further object is to provide improved electro-magnetic means for holding a movable element of a piston-type servomotor in a position to which it has been moved by differential fluid pressure.

Another object is to so embody electro-magnetic holding means in a servomotor that the energizing coil is incorporated directly in the movable element of the motor.

Yet another object is to provide improved control means for a double-acting servomotor which will cause the piston element thereof to be moved by differential fluid pressure to either extreme position and held in such positions by electro-magnetic means.

Still a further object is to provide improved means for so controlling the movable element of a double-acting piston-type servomotor that said element can, under certain operative conditions, be moved to either end of its stroke by differential fluid pressure and magnetically held at said ends, or under other operative conditions caused to assume an intermediate position without the action of differential fluid pressure.

A more specific object is to so embody electro-magnetic holding means in a fluid pressure operated servomotor for the movable element thereof that a compact and low cost motor of this type can be produced.

Still another object is to produce an improved speed - responsively controlled double - acting servomotor that will cause the movable element thereof to assume positions at either end of its stroke or an intermediate position, depending on the speed of a member to which said device is responsive.

Figure 1:
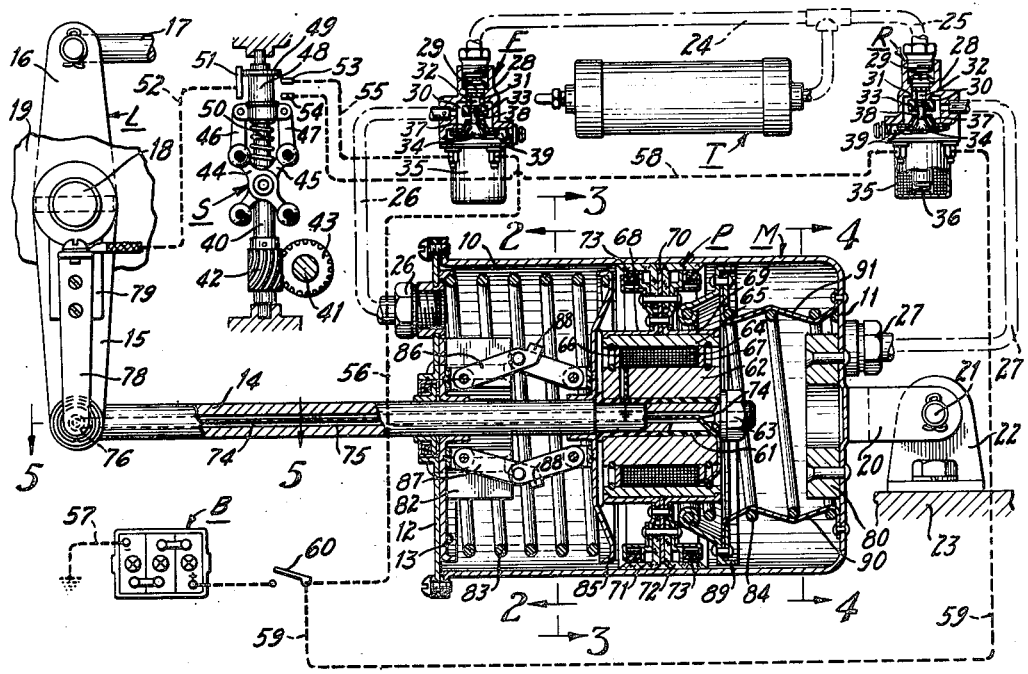
Figures 2, 3, 4, 5:
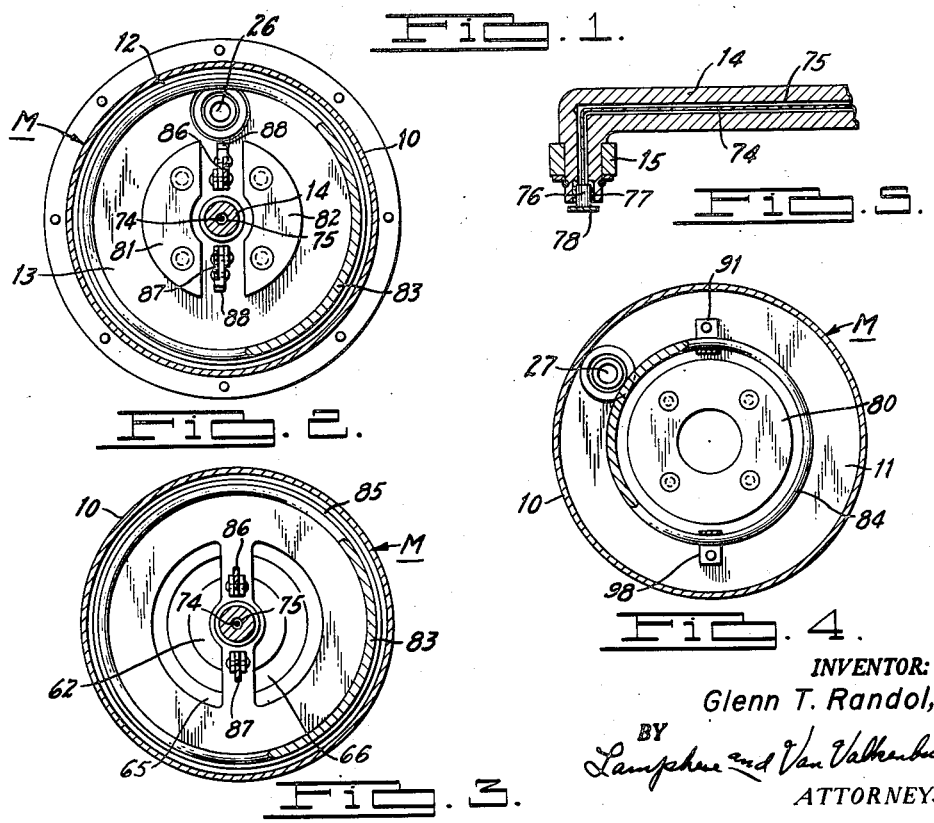

Other objects of the invention will become apparent from the following description taken in connection with the accompanying drawings in which:

Figure 1 is a view of a servomotor control system shown, by way of example, as embodying the invention, the servomotor being shown in section, parts of the control valves being broken away and the system conditioned so that the piston of the servomotor is in its central position, non-energized portions of the electrical circuit being shown in dotted outline;

Figures 2, 3 and 4 are various cross sectional views of the servomotor showing details thereof, said views being taken on the lines 2—2, 3—3 and 4—4 of Figure 1;

Figure 5 is a sectional view taken on the line 5—5 of Figure 1 and showing the electrical connection at the pivot between the piston rod and an actuated lever;

Figure 6 is a view similar to Figure 1, but showing the condition of the control system when the piston of the servomotor is moved to the left end of its stroke, non-energized portions of the electrical circuit being shown in dotted outline; and Figure 7 is another view similar to Figure 1, but showing the condition of the control system when the piston of the servomotor is moved to the right end of its stroke, non-energized portions of the electrical circuit being shown in dotted outline.

Referring to the drawings in detail, the fluid servomotor control system shown as embodying the invention comprises as its essential elements a servomotor M, a source of fluid pressure different from atmosphere shown as a tank T, two solenoid-operated control valves F and R of identical construction, a speed-responsive device S and a servomotor actuated element shown as a lever L, and a source of electricity for the various electrical circuits shown as a battery B.

The fluid servomotor M is of the double-acting piston-type and comprises a cylinder 10 having an integral right end wall 11 and a removable left end wall 12 and secured to the inner side thereof as by riveting is a saucer-shaped spring retainer 13. Within the cylinder is a reciprocal piston generally indicated by the letter P which has connected thereto a piston rod 14 extending through a packing in the left end wall 12 of the motor. The outer end of this piston rod is pivotally connected to the lever L which by way of example, is to be actuated by the piston. The lever L has one arm 15, to the free end of which is pivotally connected the piston rod 14, and a second arm 16 to which is operably connected a rod 17 leading to any particular mechanism which it is desired to actuate. The arms 15 annd 16, forming the lever L, are pinned to a common pivot shaft 18 which is arranged to be journaled in any suitable support 19. The right end of the cylinder of the servomotor is arranged to be pivotally mounted on any suitable support and to accomplish this the right wall carries a clevis 20 pivotally connected by a pin 21 with a bracket 22 secured as by bolts to any convenient support structure 23.

The particular servomotor shown, is arranged to be actuated by differential fluid pressure created from a source of sub-atmospheric pressure and, as already indicated, this is shown as a tank T. The sub-atmospheric pressure in the tank T, of course, will be established from some original source such as the intake-manifold of a combustion engine or a suction pump, neither of which is illustrated. Leading from the tank T are branch conduits 24 and 25, branch conduit 24 being connected through the valve F to a conduit 26 leading to the left end of the cylinder 10 of the servomotor. Branch conduit 25 is connected through the valve R to a conduit 27 leading to the right end of the cylinder of the servomotor.

Since the valves F and R are identical in construction, details of each are referred to by similar reference characters. Each valve comprises a casing 28 having an inlet chamber 29 which is to be connected to the tank T and an outlet chamber 30 which is connected to the servomotor. Between these two chambers is a partition 31 having a port 32 with which is associated a valve element 33. This valve element is positioned in chamber 30 and is mounted on the reduced end of the armature 34 of the solenoid 35. When the solenoid is de-energized a spring 36 is effective to act on the armature 34 to normally move the valve element 33 upwardly and close the port 32 so that communication between the tank and the servomotor is cut off. The chamber 30 is also arranged to be closed off from the solenoid and atmosphere when the port 30 is opened by the valve element. This is accomplished by a partition 37 having a port 38 through which the reduced portion of the armature 34 extends. This port 38 is arranged to be open whenever the valve element 33 closes the port 32. When the solenoid is energized to move the armature downwardly and overcomes the action of the spring 36, the valve element 33 will uncover port 32 and close off port 38. With the port 32 open, chambers 29 and 30 will be in communication with each other and thus the tank T can be placed in communication with the servomotor. The portion of the casing below the partition 37 and above the solenoid is arranged to be in constant communication with the atmosphere through an air port 39. The purpose of this air port is to insure that whenever the valve element 33 is closing off port 32, the chamber 30 and the connected end of the motor will be in free communication with the atmosphere.

With the valves F and R constructed as shown and described, it will be seen that the opposite ends of the servomotor can be connected either to the tank T or to atmosphere. If the solenoids of both the valves F and R are de-energized, then both ends of the servomotor will be disconnected from the tank T and connected to atmosphere. If the solenoid of the valve F only should be energized, then the tank T will be connected to the left end of the servomotor and consequently a differential fluid pressure will be so effective upon the piston as to move the piston to the left end of the servomotor. If the solenoid of the valve R only should be energized, then the tank T will be connected to the right end of the servomotor and differential fluid pressure will be so effective upon the piston P that it will be caused to move to the right end of the servomotor.

The valves F and R are arranged to be selectively controlled by a speed-responsive device already referred to by the letter S. This device has a shaft 40 which is rotated by a driving shaft 41 through gears 42 and 43. The driving shaft may be responsive to any rotating member such as, for example, the wheels of a motor vehicle if the control system is to be used on such. Pivotally mounted on the shaft 40 are two centrifuge members 44 and 45, the upper ends of which are connected by links 46 and 47 to a sleeve 48 carrying a conductor ring 49. A spring 50 normally biases the sleeve and conductor ring to an upper position which is the substantially normal "rest" position for the centrifuge members. The conductor ring 49 is a movable element of a switch which is to be controlled by the speed-responsive device S. The conductor ring is arranged to be in constant engagement with a fixed contact member 51 which is grounded by way of a conductor 52, said conductor also being employed to energize a coil of an electro-magnet incorporated in the piston of the servomotor, as will become apparent later. The conductor ring is selectively engageable with fixed contact elements 53 and 54 under the action of the speed-responsive device. The contact element 53 is connected by a conductor 55 to one terminal of the solenoid 35 of the valve F. The other terminal of this solenoid is connected by a conductor 56 to one terminal of the battery B, the other terminal of said battery being grounded by a conductor 57 so as to complete a circuit. The other contact element 54 is connected by a conductor 58 to one terminal of the solenoid 35 of the valve R. The other terminal of this solenoid is connected by a conductor 59 to the same terminal of the battery B, as is conductor 56.

With the aforementioned connections for the solenoids of the two valves F and R, it will be seen that if the conductor ring 49 controlled by the speed-responsive device is in engagement with the contact 53, a circuit will be established, energizing the solenoid 35 of the valve F. If the conductor ring 49 is moved to a position wherein it engages the contact 54, then a circuit will be established which will energize the solenoid of the valve R. The contacts 53 and 54 are so spaced apart and arranged with respect to the ring contact 49 that when the speed-responsive device is substantially at rest, the ring contact will be above the contact 53, as shown in Figure 1, and neither of the circuits for the solenoids of the valves F and R will be energized. However, if the shaft 40 should be so rotated in response to the speed of a rotating member that the centrifuge members will move sleeve 48 downwardly so that the conductor ring will engage the fixed contact element 53, then the circuit for the solenoid of the valve F will be energized, thus opening said valve as shown (see Figure 6). A further speeding up of the shaft 40 will result in the centrifuge members moving the conductor ring 49 an additional distance downwardly so that it will be disengaged from the contact element 53 and become engaged with the contact element 54. This will open the circuit of the solenoid of the valve F and close the circuit of the solenoid of the valve R. Valve R will then be opened as shown in Figure 7. Both circuits controlled by the speed-responsive device may be arranged to be broken, irrespective of the condition of the said speed-responsive device, by means of a manually-controlled switch 60.

The piston P of the servomotor M is so constructed that it will have associated with it the electromagnet which is employed to hold the piston at the ends of its full stroke. The piston rod 14 is reduced at its inner end and mounted thereon is a sleeve 61 on which is positioned a cylindrical member 62 of paramagnetic or highly permeable material such as soft iron. This member 62 and the sleeve 61 are clamped to the end of the rod by a bolt 63. Surrounding the member 62 is a coil 64 called the holding coil and enclosing this coil is another cylindrical member 65 of soft iron. Annular rings 66 and 67 hold the coil in position and also further provide support means for the outer cylindrical member 65. The piston P is arranged to be carried on the outer cylindrical member 65 and to accomplish this there are provided two cylindrical stampings 68 and 69 having flanges. The flanges have received therebetween an annular disk 70 and all these elements are riveted together as a unit assembly. Secured to opposite sides of this disk are two cup-shaped packing members 71 and 72 arranged in back to back relation. The lips of these cups engage the inner surface of the servocylinder so as to provide a seal for the piston, preventing air from passing in either direction. Each packing cup has associated with it suitable means, generally indicated at 73, for preventing any collapse of a lip of a cup.

The holding coil 64 has one end of its windings grounded to the piston rod. The other end of the windings is arranged to be connected by an insulated conductor 74 to the previously referred to conductor 52. The conductor 74 extends through a drill passage 75 in the piston rod 14. At the outer end of the passage 75 the conductor is provided with a contact member 76 which is insulated from the end of the piston rod by nonconducting material 77, all as shown in Figure 5. It will be noted that the outer end of the piston rod 14 is formed with a lateral extension and this extension is journaled in the lower end of the arm 15 of the lever L. The contact member 76 is at the end of this lateral extension of the piston rod and is arranged to project slightly beyond the end of said extension. The arm 15 carries a conductor finger 78 whereby the contact member 76 can be continuously connected to the conductor 52. The upper end of the finger is secured to the arm 15 adjacent the pivot 18 of the lever L and is insulated from the arm by suitable insulating material 79. To the upper end of the member 78 adjacent to the pivot, the conductor 52 is connected. With this arrangement, it will be seen that the conductors 52 and 74 are connected together so as to complete the circuit to the holding coil and yet pivotal movement between the piston rod 14 and the arm 15 is freely accommodated without any appreciable movement of conductor 52. As the arm 15 of the lever L is moved by the piston rod, the lower end of the conductor element 78 will merely turn on the contact member 66 and contact will be maintained.

Since the electro-magnet is to perform a holding function, it is necessary to provide paramagnetic material at the ends of the stroke so as to form a path for the magnetic lines of force created by the electro-magnet. This is accomplished by providing at the right end of the servomotor a circular member 80 of soft iron, this member being riveted directly to the inside of the right wall 11 of the motor. The left end wall of the cylinder also has similarly attached paramagnetic material and, for purposes which shall later become apparent, such being in the form of two soft iron segmental members 81 and 82, so formed and mounted as to provide an axial opening therebetween.

It is desirable that the piston P be capable of assuming a central position between the ends of its full stroke whenever the electro-magnetic holding means is not effective to hold the piston at one end of its stroke, and also when there is no differential fluid pressure acting on the piston. This centering of the piston is accomplished by means of springs acting on opposite sides of the piston. The arrangement of the springs is such, however, that each spring is capable of moving the piston only to the central position and thereafter is no longer effective in continuing to apply any force to the piston if the piston moves in either direction beyond the central position. Between the piston and the left end wall of the servomotor is a coil spring 83 and between the piston and the right end wall of the motor is a coil spring 84.

The coil spring 83 is arranged to have its end adjacent the piston act upon a saucer-shaped disk member 85 which has openings as shown in Figure 3 and is slidably mounted on the piston rod. The spring will thus act through this member onto the piston. In order to prevent the spring 83 from continuing to act upon the piston after the piston assumes its central position, said position being shown in Figure 1, the disk is connected to the left end wall of the cylinder by two collapsible toggles 86 and 87. Since one link of each toggle is pivotally connected to the left end wall of the cylinder and the other link is pivotally connected to the disk member, the toggles when in extended position will limit the movement of the disk member by the spring. Both toggles are so constructed that they will not become fully extended when the piston is at the central position. This is accomplished by providing one of the links of each toggle with a lateral flange or stop 88 which will overlie and engage the other link adjacent the common pivot of the toggle. The flanges 88 will thus prevent the toggles from fully extending so that these toggles can be collapsed or folded easily when the piston moves to the left end of the cylinder. In connecting the toggles to the left end wall of the cylinder, they are arranged to extend through the opening between the two segmental soft iron members 81 and 82 secured as by rivets to the left end wall of the cylinder. With this arrangement, the toggles, when caused to be folded by movement of the piston in the manner shown in Figure 6, will thus be received in the opening and the holding coil carried by the piston can be brought into engagement with the segmental soft iron members. The soft iron members in engaging the holding coil extend through the openings in the disk member 85.

The spring 84 which is to act on the piston and move it from the right end of the cylinder to its central position is prevented from acting to move the piston beyond the central position by means of a disk member 89 and flexible metal straps 90 and 91. The inner end of the spring is arranged to act upon the disk member 89 and through it to move the piston to its central position from the right end of the servomotor. In order to prevent movement of the disk after the piston reaches its central position, the flexible straps 90 and 91 come into play. One end of each of these straps is connected to the disk member and the other end to the inside of the right end wall of the cylinder. Each strap is threaded alternately over and under the convolutions of the spring. When the spring is compressed, the straps will thus be forced by the threading to become folded in the manner of accordion plaiting. This will prevent the straps from interfering with the movement of the piston to the right end of its stroke wherein the soft iron of the electro-magnet carried by the piston will be brought into engagement with the soft iron member 80 and thus establish a magnetic holding action.

*Operation*

With the speed-responsive device S substantially at rest and/or the manually-controlled switch 60 open, the condition of all of the elements of the control system for the servomotor M will be as shown in Figure 1. The piston P will be at the central position of its stroke, having been moved to such position by the centering springs 83 and 84. The reason that these centering springs can move the piston to its central position is that both ends of the servomotor will be connected to atmosphere due to the deenergized condition of the two valves F and R. It will also be noted that the circuit for neither solenoid of the valves will be energized, due to the fact that the conductor ring 49 controlled by the speed-responsive device is not in contact with either fixed contact 53 nor 54 nor is the switch 60 closed. Since the energizing of the holding coil 64 of the electro-magnet is controlled by the engagement of the conductor ring 49 with either fixed contact 53 or 54 while the switch 60 is closed, then of course the holding coil will not be energized when the speed-responsive device is at rest.

If it is now considered that the manual switch 60 is closed and the rotating element that controls the speed-responsive device is caused to rotate, the centrifuge members will be so moved that the conductor ring 49 will be moved downwardly from the position shown in Figure 1 to a position wherein it will engage the upper fixed contact 53. A circuit will now be closed which will include the solenoid 35 of the valve F and the holding coil of the electro-magnet. When the solenoid of valve F is energized it will open the valve and thus connect the left end of the cylinder of the servomotor with the tank T. Differential fluid pressure will then become effective on the piston P, as the air from the left end of the cylinder of the servomotor is withdrawn. This differential fluid pressure will so act on the piston P as to move it to the left from its central position shown in Figure 1 and to the extreme left end of the cylinder as shown in Figure 6. Since the electro-magnet is now energized, a magnetic path will be established with the fixed segmental soft iron members 81 and 82 and the electro-magnet will thus hold the piston at the left end of the servomotor cylinder 10 and maintain the centering spring 83 compressed. As long as the electro-magnet continues to be energized, the piston will remain at the left end of the cylinder of the servomotor, even though the differential fluid pressure may become insufficient to hold the spring 83 compressed. When the piston moves to the left end of the servomotor from its central position, the spring 84 will not follow the piston as it is prevented from further expanding by the disk 84 and the flexible straps 90 and 91.

If the speed-responsive device should now be operated by a greater speed, the centrifuge members will be so moved as to pull the conductor ring 49 downwardly and thus move it from engagement with the fixed contact 53. As soon as engagement with contact 53 no longer exists, the solenoid 35 of the valve F will be de-energized, thus causing this valve to become closed and atmospheric air to enter the left end of the servomotor. Also, the holding coil of the electro-magnet will be de-energized. When this is done the magnetic holding action on the piston will become so small that the spring 83 can expand and move the piston P back to the central position.

If the speed to which the speed responsive device is responsive should now increase further, the conductor ring 49 will be brought into engagement with the contact 54, thus closing a circuit which will energize solenoid 35 of the valve R and also cause the coil of the electro-magnet to again be energized. Energization of the solenoid 35 of the valve R will open this valve so that the tank T can be connected to the right end of the servomotor and thus withdraw air from such end. As a result, a differential fluid pressure will be so effective on the piston that the piston will be moved to the extreme right end of the servomotor, which position is shown in Figure 7. As the electro-magnet is already energized, then as soon as the piston reaches the right end it will be held there by the magnetic forces existing between the electro-magnet and the soft iron member 80 fixed to the inside of the right end wall of the servomotor. As the piston is moved to the right end of the servomotor, the centralizing spring 84 will be compressed. The other centralizing spring 83 at the left end of the servomotor will not, however, expand to act upon the piston, but will be held in the position it has assumed when the piston was at the central part of its stroke. This is accomplished by the toggles 86 and 87. The piston will remain at the right end of the servomotor as long as the speed-responsive device maintains the conductor ring 49 engaged with the fixed contact element 54.

If the speed of the member to which the speed-responsive device is responsive should decrease so that the conductor ring 49 should become disengaged with the fixed contact element 54, the valve R will become closed and the electro-magnet de-energized. Consequently, the magnetic holding action on the piston will no longer be so effective as to hold the piston at the right end of the servomotor against the spring 84 and also there will be no differential fluid pressure acting on the piston as the closing of valve R connected the right end of the servomotor to atmosphere. The result will be that the centering spring 84 can expand and move the piston back to its central position as shown in Figure 1. If the conductor ring 49 should be so moved by the speed-responsive device that it will again engage fixed contact 53, then of course the valve F will be opened, the electro-magnet energized and the piston moved to the left end of the servomotor wherein it will be held by the action of the electro-magnet, all in the manner previously described.

From the foregoing description it is believed to be apparent that the control means for the novel servomotor M is simple and efficient to accomplish the results desired. With the holding coil carried by the piston, only one holding coil is required. This holding coil is so embodied in the piston that a minimum space is used. The use of a single holding coil carried by the piston also insures that the overall length of the servomotor can be less than where two separate holding coils are employed with such coils fixed at the ends of the cylinder. The control of the servomotor is also such that centering springs can be employed to place the piston at the central portion of its stroke. The electro-magnetic means insures that the piston will be held at the ends of its stroke and insures that the action of the centering springs cannot return the piston to its central position if the differential fluid pressure becomes substantially non-existant.

The servomotor control means is very useful where it is desired to control the piston of such motors so that it can assume a held position at either end of its stroke under certain operative conditions, or to assume a central position between the ends of its stroke under other operative conditions. The use of the speed responsive device makes the controlling automatic for predetermined speed conditions of a rotatable member. If automatic controlling is not desired, then the speed-responsive device can be replaced by manual means, which manual means could also directly control the two valves F and R. One particular use of the control means is for servomotors employed in the changing of gear ratios of a motor vehicle change-speed gearing.

Being aware of the possibility of modifications in the particular structure shown and described by way of example as embodying the invention, it is not intended that the scope of the invention be limited in any manner except in accordance with the appended claims.

I claim as my invention:

1. In a control means for a fluid pressure actuated servomotor having a fluid-tight container and a movable element disposed in said container for movement therein, and a member carried by and movable with said element for actuation in accordance with fluid pressure-responsive movement of said element, a valve having an open position for establishing differential fluid pressures on opposite sides of said movable element to thereby move said element to a predetermined position, magnetic means for holding said element in said predetermined position including electromagnetic means carried by and movable with the movable element, fixed paramagnetic means for cooperation with said electromagnetic means when said element is moved to its predetermined position, solenoid means for opening said valve, and means for simultaneously energizing the solenoid means and the electromagnetic means to open said valve for effecting movement of said element to said predetermined position and to condition said electromagnetic means for coaction with said paramagnetic means, said energizing means including an electrical conductor substantially coextensive with said member and movable therewith for maintaining energization of said electromagnetic means whenever said solenoid means is energized despite the adjusted position of said element.

2. In a control means for a fluid pressure actuated servomotor having a casing and a movable element reciprocable in said casing for actuation to a predetermined position at one end of its stroke by differential fluid pressure in said casing; the improvements of an electromagnet carried by and movable with the element, paramagnetic material located in said casing for electromagnetic coaction with said electromagnet when said movable element is at said one end of its stroke, means for energizing the electromagnet when said element is in its said predetermined position including a conductor substantially coextensive with said element and movable therewith, said electromagnet and said paramagnetic material retaining said element in its said predetermined position, and spring means acting on the element to oppose retention of said element at the said one end of its stroke by the magnetic force effective substantially at the saturation point between the energized electromagnet and said paramagnetic material.

3. In control means for a fluid pressure actuated servomotor having a piston and a hollow piston rod, means for establishing different fluid pressure on opposite sides of said piston to thereby move it to a predetermined position, and means for holding said piston in said predetermined position including an electromagnetic coil carried by and movable with said piston, paramagnetic material fixed to said fluid servomotor for cooperation with said coil to provide a magnetic path when said piston is in its said predetermined position, and means for connecting the coil means to a source of electricity including a conductor extending through the hollow piston rod.

4. A fluid pressure actuated servomotor comprising a casing having spaced end walls and a cylindrical inner wall therebetween, a reciprocable actuating rod having an end portion projecting into said casing, an electromagnet including an energizable coil and concentric permeable pole pieces fixedly mounted on said rod to surround said end portion thereof, paramagnetic material affixed to one of the end walls of said casing for bridging said pole pieces when said rod end portion is actuated to the corresponding end of said casing, means carried by said rod for movement therewith to define a fluid-tight wall between said electromagnet and said casing inner wall, an electrical conductor extending axially along said rod and substantially coextensive therewith for connection to a source of electrical energy to energize said electromagnetic coil at any adjusted position thereof, and means for introducing fluid at a pressure different from that of the atmosphere into said casing on one side of said wall to effect movement of said rod and said electromagnet toward said one casing wall.

5. A fluid pressure actuated servomotor comprising a casing, a reciprocable hollow rod projecting into said casing, an electromagnet including an energizable coil mounted on said rod in surrounding relation thereto, means defining an imperforate wall between the electromagnet and the casing, means including a source of fluid pressure different from atmosphere for establishing differential fluid pressure on opposite sides of said wall to effect movement of said rod and said electromagnet relative to said casing, and means for energizing said coil including an electrical conductor extending through said hollow rod.

6. A fluid pressure actuated servomotor comprising a casing having opposing end walls and an inner wall extending therebetween, a movable rod projecting into said casing, a pair of concentric radially spaced magnetizable poles fixedly secured to said rod for movement therewith, an electrically energizable coil interposed between said poles and cooperating therewith to define an electromagnet, means for energizing said coil including a conductor carried coextensively by said rod, means carried by and projecting outwardly from said coil for sealing contact with said casing inner walls, and magnetizable means secured to one of said end walls for bridging the gap between said poles when said rod is moved to bring said poles into contact therewith.

7. In a fluid pressure actuated servomotor, a casing, a movable element therein, a rod connected to said element to be actuated thereby, means for biasing said element away from one end of said casing and to a predetermined position including a continuously tensioned coil spring and a stop member for the spring, said spring being interposed between the end of said casing and said stop member, and said stop member being arranged to apply the spring force to said movable element but accommodating movement of said element relatively thereto in a direction away from the said one end of said casing, and means for limiting the extent of movement of said stop member by said spring in a direction away from the said casing and comprising a flexible member connected to the said one casing end and to said stop member and being threaded over and under alternate convolutions of said spring.

8. In a fluid pressure actuated servomotor, a casing, a movable element therein, a rod connected to said element to be actuated thereby, means for biasing said element in a direction away from one end of said casing and to a predetermined position including a continuously tensioned spring and a stop member, said spring being interposed between said one end of the casing and said stop member such that the force of said spring is applied to said movable element notwithstanding said element moves relatively thereto away from the said one end of the casing, and means for limiting the extent of movement of said stop member by said spring away from the said one end of said casing comprising links pivotally connected to one another and to said one casing end and to said stop member to form a toggle and means associated with said links at their common pivot for preventing said links from assuming aligned positions.

9. In a control means for a fluid pressure actuated servomotor having a movable element positioned in a casing provided with an end wall, said element carrying a reciprocable actuating rod, an electromagnet carried by and movable with said element toward and away from said end wall, paramagnetic material carried by said end wall and projecting into said casing into the path of movement of said element for contact with said electromagnet when said movable element is caused by differential fluid pressure in said casing to be at one end of its stroke to provide magnetic holding means for the element when the electromagnet is energized, a stop member slidably mounted on said actuating rod and interposed between said element and said paramagnetic material, said member being apertured to accommodate direct electromagnet and paramagnetic material contact, a continuously tensioned spring acting on said slidable member to bias said movable element to a position remote from said paramagnetic material, and collapsible means for limiting the movement of said slidable member under the influence of said spring while accommodating movement of said element with respect to said member in a direction away from said member.

10. In a control means for a fluid pressure actuated servomotor movable element positioned in a casing for reciprocation therein in response to differential fluid pressures and having an actuating rod, and means including a source of fluid pressure different from atmosphere for establishing differential fluid pressure on opposite sides of said element; the improvements which comprise an electromagnet carried by and movable with said element, paramagnetc material carried by said casing adjacent said electromagnet when said movable element is moved by differential fluid pressures to one end of its stroke to thereby provide magnetic holding means for the element when the electromagnet is energized, a stop member slidably mounted on said actuating rod between said element and said paramagnetic material, a continuously tensioned spring acting on said slidable stop member to bias said movable element to a position remote from said paramagnetic material, and means for limiting the movement of said slidable stop member under the influence of the spring but not preventing movement of said element with respect to said stop member in a direction away from said stop member, said last-named means including a toggle having means for limiting its extension and said paramagnetic material being positioned with respect to said toggle so that the toggle, when collapsed by the movement of said movable element of the servomotor, will be disposed rearwardly of a forward face of said paramagnetic material.

11. In a control means for a double acting fluid pressure actuated servomotor having a movable element, a source of fluid pressure different from atmosphere, valve means for controlling the communication between said source and opposite ends of said servomotor; the improvements of electromagnetic means for holding said element at each end of the servomotor and including an energizable coil telescopically mounted on and secured to said movable element for movement therewith, means for selectively controlling said valve means so that said servomotor element can be moved by fluid pressure to either end of said servomotor, electrical circuit means for energizing said coil, and means for closing said electrical means to thereby energize the coil only when said element is caused to be moved to an end of said motor by a controlling of said valve means.

12. In a control means for a double acting fluid pressure actuated servomotor having an axially movable piston, a source of fluid pressure different from atmosphere, valve means for controlling the communication between said source and opposite ends of said servomotor; the improvements of electromagnetic means for holding said element at each end of the servomotor, including an energizable coil concentric with and telescopically received by said piston to fit substantially within the normal axial dimensions of said piston, said coil being movable with said piston, and fixed paramagnetic material carried by each end of said servomotor, and electrical means including circuits and switches for selectively controlling said valve means so that said servomotor element can be moved by fluid pressure to either end of said servomotor and for additionally causing energization of said coil so that said element will be held in its end position by said electromagnetic means.

13. In a control means for a double acting fluid pressure actuated servomotor having an axially movable element, a source of fluid pressure different from atmosphere, valve means for controlling the communication between said source and opposite ends of said servomotor, electromagnetic means for holding said element at each end of said servomotor and comprising an energizable coil mounted on said movable element and lying substantially within the movable element, said coil being movable axially with said element, electrical means including switches for selectively controlling said valve means so that said servomotor element and said coil can be moved by fluid pressure to either end of said servomotor, and means for energizing said coil so that said element will be held in its end position by said electromagnetic means.

14. In control means for a double-acting fluid pressure energizable servomotor having a movable piston controllable in response to the speed of a rotating member; a source of fluid pressure different from atmosphere for energizing the servomotor; valve means for selectively controlling application of said fluid pressure to opposite ends of the servomotor to energize the same; electromagnetic means for holding said piston at either extreme end of the servomotor, including an energizable coil carried by said piston for movement therewith and confined substantially within the axial dimensions of said piston; electrical means including at least a pair of switches for controlling said valve means; and a speed-responsive device driven from said rotating member for controlling said switches to cause energization of the servomotor by application of said fluid pressure to a selected end thereof to effect movement of said piston to said extreme end, and for simultaneously energizing said coil to retain said piston in said extreme end by said electromagnetic means.

GLENN T. RANDOL.

REFERENCES CITED

The following references are of record in the file of this patent:

UNITED STATES PATENTS

| Number    | Name      | Date           |
|-----------|-----------|----------------|
| 2,056,006 | Hodgkins  | Sept. 29, 1936 |
| 2,301,576 | Parsons   | Nov. 10, 1942  |
| 2,349,185 | Matulaitis| May 16, 1944   |
| 2,436,388 | Iavelli   | Feb. 24, 1948  |

FOREIGN PATENTS

| Number  | Country       | Date          |
|---------|---------------|---------------|
| 460,551 | Great Britain | Jan. 29, 1937 |